United States Patent
Wurzburg et al.

(10) Patent No.: US 7,433,990 B2
(45) Date of Patent: Oct. 7, 2008

(54) TRANSFERRING SYSTEM INFORMATION VIA UNIVERSAL SERIAL BUS (USB)

(75) Inventors: Henry Wurzburg, Austin, TX (US); Mark Yi-Li Fu, Newark, CA (US)

(73) Assignee: Standard Microsystems Corporation, Hauppauge, NY (US)

( * ) Notice: Subject to any disclaimer, the term of this patent is extended or adjusted under 35 U.S.C. 154(b) by 67 days.

(21) Appl. No.: 11/338,924

(22) Filed: Jan. 24, 2006

(65) Prior Publication Data

US 2007/0174534 A1 Jul. 26, 2007

(51) Int. Cl.
*G06F 13/36* (2006.01)

(52) U.S. Cl. .......................... 710/315; 710/62

(58) Field of Classification Search ............ 710/5, 710/30, 313, 315, 18–19, 62, 105, 11
See application file for complete search history.

(56) References Cited

U.S. PATENT DOCUMENTS

| | | | |
|---|---|---|---|
| 4,390,964 A | 6/1983 | Horky et al. |
| 5,233,692 A | 8/1993 | Gajjar et al. |
| 5,541,985 A | 7/1996 | Ishii et al. |
| 5,630,081 A | 5/1997 | Rybicki et al. |
| 5,784,581 A | 7/1998 | Hannah |
| 5,786,769 A | 7/1998 | Coteus et al. |
| 5,793,359 A | 8/1998 | Ushikubo |
| 5,815,167 A | 9/1998 | Muthal et al. |
| 5,815,426 A | 9/1998 | Jigour et al. |
| 5,841,654 A | 11/1998 | Verissimo et al. |
| 5,877,483 A | 3/1999 | Bilich et al. |
| 5,890,015 A | 3/1999 | Garney et al. |
| 5,953,511 A | 9/1999 | Sescila, III et al. |
| 5,966,510 A | 10/1999 | Carbonneau et al. |
| 6,000,607 A | 12/1999 | Ohki et al. |

(Continued)

FOREIGN PATENT DOCUMENTS

EP 0982663 A 3/2000

(Continued)

OTHER PUBLICATIONS

"USB2601/USB2602 4th Generation USB2.0 Flash Media Controller with Integrated Card Power FETs and HS Hub"; Datasheet; May 25, 2005; 26 pages; SMSC; Hauppauge, NY.

(Continued)

*Primary Examiner*—Clifford H Knoll
(74) *Attorney, Agent, or Firm*—Meyertons Hood Kivlin Kowert & Goetzel, P.C.; Jeffrey C. Hood; Russell E. Henrichs

(57) ABSTRACT

In various embodiments, a system may include a processor, a host controller coupled to the processor, a Universal Serial Bus (USB) device coupled to the host controller and a non-USB device coupled to the USB device. In some embodiments, the host controller may be configured to communicate with the non-USB device through a small computer system interface (SCSI) pass-through command. In some embodiments, a method may include a host controller sending a SCSI pass-through command to a USB device coupled to a non-USB device, the USB device receiving the SCSI pass-through command, and the USB device interacting with the non-USB device in response to the SCSI pass-through command.

20 Claims, 9 Drawing Sheets

U.S. PATENT DOCUMENTS

| | | | |
|---|---|---|---|
| 6,119,196 | A | 9/2000 | Muller et al. |
| 6,141,719 | A | 10/2000 | Rafferty et al. |
| 6,145,045 | A | 11/2000 | Falik et al. |
| 6,168,077 | B1 | 1/2001 | Gray et al. |
| 6,185,641 | B1 | 2/2001 | Dunnihoo |
| 6,205,501 | B1 | 3/2001 | Brief et al. |
| 6,230,277 | B1 | 5/2001 | Nakaoka et al. |
| 6,279,060 | B1 | 8/2001 | Luke et al. |
| 6,304,995 | B1 | 10/2001 | Smith et al. |
| 6,308,239 | B1 | 10/2001 | Osakada et al. |
| 6,317,839 | B1 | 11/2001 | Wells |
| 6,324,605 | B1 | 11/2001 | Rafferty et al. |
| 6,349,878 | B2 | 2/2002 | Imai |
| 6,389,544 | B1 | 5/2002 | Katagiri |
| 6,405,362 | B1 | 6/2002 | Shih et al. |
| 6,435,904 | B1 | 8/2002 | Herbst et al. |
| 6,438,638 | B1 | 8/2002 | Jones et al. |
| 6,460,143 | B1 | 10/2002 | Howard et al. |
| 6,467,042 | B1 | 10/2002 | Wright et al. |
| 6,480,927 | B1 | 11/2002 | Bauman |
| 6,505,267 | B2 | 1/2003 | Luke et al. |
| 6,510,524 | B1 | 1/2003 | Osborn et al. |
| 6,519,669 | B1 | 2/2003 | Yanagisawa |
| 6,532,512 | B1 | 3/2003 | Torii et al. |
| 6,557,754 | B2 | 5/2003 | Gray et al. |
| 6,564,275 | B1 | 5/2003 | Chen |
| 6,598,100 | B2 | 7/2003 | Shu et al. |
| 6,600,739 | B1 | 7/2003 | Evans et al. |
| 6,601,146 | B2 | 7/2003 | Auslander et al. |
| 6,601,180 | B1 | 7/2003 | Paredes et al. |
| 6,622,195 | B2 | 9/2003 | Osakada et al. |
| 6,654,841 | B2 | 11/2003 | Lin |
| 6,671,765 | B1 | 12/2003 | Karlsson et al. |
| 6,678,760 | B2 | 1/2004 | Brief |
| 6,681,991 | B1 | 1/2004 | Li |
| 6,694,381 | B2 | 2/2004 | Lo et al. |
| 6,714,215 | B1 | 3/2004 | Flora et al. |
| 6,725,302 | B1 | 4/2004 | Benayoun et al. |
| 6,732,218 | B2 | 5/2004 | Overtoom et al. |
| 6,775,733 | B2 | 8/2004 | Chang et al. |
| 6,816,929 | B2 | 11/2004 | Ueda |
| 6,901,456 | B1 | 5/2005 | Leak |
| 6,910,627 | B1 | 6/2005 | Simpson-Young et al. |
| 6,928,562 | B2 | 8/2005 | Cohen et al. |
| 6,934,711 | B2 | 8/2005 | Pooni et al. |
| 6,945,454 | B2 | 9/2005 | Tournemille et al. |
| 6,959,355 | B2 | 10/2005 | Szabelski |
| 6,990,549 | B1 | 1/2006 | Main et al. |
| 6,993,620 | B2 | 1/2006 | Ferguson |
| 7,024,501 | B1 | 4/2006 | Wright |
| 7,028,114 | B1 | 4/2006 | Milan et al. |
| 7,028,133 | B1 | 4/2006 | Jackson |
| 7,039,727 | B2 * | 5/2006 | Camara et al. ................. 710/5 |
| 7,047,343 | B2 | 5/2006 | Shaw |
| 7,086,583 | B2 | 8/2006 | Wurzburg |
| 7,149,888 | B1 * | 12/2006 | Hart et al. ....................... 713/2 |
| 7,159,766 | B2 | 1/2007 | Wurzburg et al. |
| 7,185,126 | B2 | 2/2007 | Szabelski |
| 7,210,619 | B2 | 5/2007 | Wurzburg |
| 7,222,252 | B2 | 5/2007 | Dutton et al. |
| 2001/0032280 | A1 | 10/2001 | Osakada et al. |
| 2002/0154625 | A1 | 10/2002 | Ma |
| 2002/0155893 | A1 | 10/2002 | Swanberg et al. |
| 2002/0178304 | A1 * | 11/2002 | Camara et al. ................. 710/11 |
| 2003/0025683 | A1 | 2/2003 | Adler |
| 2003/0058284 | A1 | 3/2003 | Toh et al. |
| 2003/0167345 | A1 | 9/2003 | Knight et al. |
| 2003/0227438 | A1 | 12/2003 | Campbell et al. |
| 2004/0019732 | A1 | 1/2004 | Overtoom et al. |
| 2004/0027879 | A1 | 2/2004 | Chang |
| 2004/0078514 | A1 * | 4/2004 | Kung et al. ................. 711/105 |
| 2004/0088449 | A1 | 5/2004 | Sakaki |
| 2004/0130505 | A1 * | 7/2004 | Lee et al. ...................... 345/30 |
| 2004/0143768 | A1 | 7/2004 | Calhoon |
| 2004/0153597 | A1 | 8/2004 | Kanai et al. |
| 2004/0168001 | A1 | 8/2004 | Szabelski |
| 2004/0168009 | A1 | 8/2004 | Szabelski |
| 2004/0221181 | A1 | 11/2004 | Yu |
| 2004/0225808 | A1 | 11/2004 | Govindaraman |
| 2005/0060636 | A1 | 3/2005 | Mathe |
| 2005/0114716 | A1 | 5/2005 | O |
| 2006/0020737 | A1 | 1/2006 | Szabelski |
| 2006/0056401 | A1 | 3/2006 | Bohm et al. |
| 2006/0059293 | A1 | 3/2006 | Wurzburg et al. |
| 2006/0227759 | A1 | 10/2006 | Bohm et al. |
| 2007/0023499 | A1 | 2/2007 | Wurzburg et al. |
| 2007/0139705 | A1 * | 6/2007 | Ogiwara et al. ............ 358/1.15 |

FOREIGN PATENT DOCUMENTS

| | | |
|---|---|---|
| GB | 2352540 A | 1/2001 |
| JP | 07-334633 | 12/1995 |
| JP | 408050643 | 2/1996 |
| JP | 2000-242377 | 9/2000 |
| JP | 2001-043178 | 2/2001 |
| JP | 2003-195991 | 7/2003 |
| KR | 10-2004-0008365 A | 1/2004 |
| KR | 10-0490068 B1 | 5/2005 |

OTHER PUBLICATIONS

"USB2602 4th Generation USB2.0 Flash Media Controller with Integrated Card Power FETs and HS Hub" http://web.archive.org/web/20050628082424/http://www.smsc.com/main/catalog/usb2602.html; Web archive dated Jun. 28, 2005; 7 pages; SMSC; Hauppauge, NY.

"USB2502 2-Port USB2.0 Hub Controller"; Datasheet; Nov. 11, 2005; 42 pages; SMSC; Hauppauge, NY.

U.S. Appl. No. 11/412,431, entitled "System and Method for Universal Serial Bus Hub Port Reversal", filed Apr. 27, 2006, by inventors Bohm, et al.

"FSUSB11 Low Power Full Speed USB (12Mbps) Switch"; Apr. 2004 (Revised Jul. 2004); 9 pages; Fairchild Semiconductor Corp.; South Portland, ME.

"FSUSB11 Low Power High Bandwith USB Switch Dual SPDT Multiplexer/Demultiplexer"; Apr. 2004 (Revised Jul. 2004); 7 pages; Fairchild Semiconductor Corp.; South Portland, ME.

Fred Zlotnick; "NLAS4717 Analog Switch Permits USB 1.1 Switching"; AND8158-D Application Note; May 2004; 4 pages; On Semiconductor.

"On-The-Go Supplement to the USB 2.0 Specification—Revision 1.0", Dec. 18, 2001; 74 pages.

"Programmable Multi-Hose Device Sharing USB Hub"; Research Disclosure, IBM Corp.; Feb. 1, 1999; Mason Publications; Hampshire, GB; one page.

"TetraHub High-speed USB Hub Controller"; Publication No. CY7C6540; Dec. 5, 2002; 25 pages; Cypress Semiconductor Corporation.

"Universal Serial Bus Specification, Revision 2.0"; Chapter 11: Hub Specification; Apr. 27, 2000; pp. 297-437; Compaq, Hewlett-Packard, Intel, Lucent, Microsoft, NEC, Philips.

"USB 1.1 Switch Offers Low Power and Bandwidth"; Jul./Aug. 2004; 3 pages; Fairchild Semiconductor Corp.; South Portland, ME.

"USB hub"; from Wikipedia, the free encyclopedia (http://en.wikipedia.org?wiki/USB_hub); 2 pages.

"USB2524 USB MultiSwitch Hub"; SMSC Datasheet; Jul. 17, 2006; 57 pages; Standard Microsystems Corp., Hauppauge, NY.

"FSUB22 Low Power 2 Port Hi-Speed USB 2.0 (480Mbps) Switch"; Jan. 2005 (Revised Jun. 2005); 11 pages; Fairchild Semiconductor Corp.; South Portland, ME.

"The Laptop Computer May Be Unable to Enter the C3 Processor Power-Saving State"; printed from the internet: http://support.microsoft.com/default.aspx?scid=kbjen-us;297045; (Article publication date is unknown).

"Advanced Configuration and Power Interface Specification", Revision 2.0c, Aug. 25, 2003; pp. 1-200.

"Advanced Configuration and Power Interface Specification", Revision 2.0c, Aug. 25, 2003; pp. 201-518.

Prior Art Statement (1 page).

"USB2524 USB2.0 Compatible 4-Port Switching Hub with Two Upstream Host Ports"; SMSC Datasheet; Nov. 11, 2005; 26 pages; Standard Micorsystems Corp., Hauppauge, NY.

U.S. Appl. No. 11/071,961, entitled "Power Managed USB for Computing Applications Using a Controller", by Drew J. Dutton, James R. MacDonald, and Henry Wurzburg Wurzburg, filed Mar. 4, 2005.

* cited by examiner

TRANSFERRING SYSTEM INFORMATION VIA UNIVERSAL SERIAL BUS (USB)

BACKGROUND

1. Field of the Invention

The present invention relates generally to computer systems and, more specifically, to information exchange over universal serial bus (USB).

2. Description of the Related Art

USB is becoming an increasingly common communication path between computer systems and peripheral devices. Computer systems may communicate with USB devices (such as mass storage USB devices) using a standard protocol over a USB bus. When a USB device electrically connects to a computer system, a host controller on the computer system enumerates the USB device and initiates loading a device driver to communicate with the USB device (e.g., computer systems may implement a mass storage device class to communicate with USB storage devices). USB storage devices may include card readers, magnetic hard drives, optical drives (for compact discs (CDs) and digital versatile discs (DVDs)), flash memory devices (such as keydrives), digital cameras, digital audio players, etc.

SUMMARY

In one embodiment, a system may comprise a host controller coupled to a USB device which in turn couples to a non-USB device. A controller on the non-USB device may be coupled to the host controller of a computer system through the USB device (e.g., through a controller on the USB device).

In some embodiments, the host controller may communicate with the non-USB device by embedding communications (e.g., commands and instructions) in SCSI pass-through commands sent to the USB device. The SCSI pass-through commands may be initiated by a USB mass storage class driver executing on the computer system and may be sent to a mass storage device controller (such as a USB media controller) on a USB mass storage device (e.g., the USB device). The mass storage device controller may pass the embedded commands directly to the non-USB device (e.g., to the controller of the non-USB device) or may communicate with the non-USB device as directed by the commands. In addition, the non-USB device may communicate with the host controller through communications (e.g., embedded in SCSI pass-through commands) sent from the mass storage device controller to the host controller.

In some embodiments, the host controller may send a SCSI pass-through command to the USB device, and the USB device may interact with the non-USB device in response to the SCSI pass-through command. For example, the command may instruct the USB device to poll the non-USB device. In some embodiments, the USB device may send an instruction or other data to the non-USB device. In some embodiments, the USB device may also send information to the host controller in response to the SCSI pass-through command received from the host controller. For example, the USB device may send information on the status of one or more components of the non-USB device to the host controller. In some embodiments, the computer system may implement a function in response to the information returned to the host controller. For example, if the USB device sends information back to the host controller indicating a button on the non-USB device has been pressed, the computer system may implement an on-screen menu with options for a user to select relative to the pressed button. In some embodiments, the host controller may then send a SCSI pass-through command with instructions for the non-USB device based on the user selection.

In some embodiments, software executing on a computer system may request information from a non-USB device coupled to the computer system through the USB device. In some embodiments, the software may regularly request (e.g., poll) information from the non-USB device (e.g., may request the status of buttons on the non-USB device). In some embodiments, the request may be transmitted as a command embedded in a SCSI pass-through command. The information may be provided by the non-USB device or may be information collected/monitored by the USB device with respect to the non-USB device. In some embodiments, the USB media controller may return the requested information to the computer system.

In some embodiments, the software executing on the computer system may launch a function in response to the received information. For example, if the non-USB device is a monitor and the information indicates a button (e.g., a brightness button) has been pressed, the software may implement an on screen menu with a brightness selector for the user. In some embodiments, the user may interface with the displayed on screen menu using a mouse cursor. In some embodiments, the computer system may send an instruction to the non-USB device to adjust the brightness of the monitor (e.g., in response to a user selecting an increased brightness on an on-screen menu). In some embodiments, the instruction may include information embedded in the SCSI command sent to the non-USB device to affect the operation of the non-USB device (e.g., the information may include a requested brightness value). The non-USB device may receive and act on the information (e.g., the monitor may receive the requested brightness value through the USB device and may adjust the monitor brightness).

BRIEF DESCRIPTION OF THE DRAWINGS

A better understanding of the present invention may be obtained when the following detailed description is considered in conjunction with the following drawings, in which.

Figure 1:
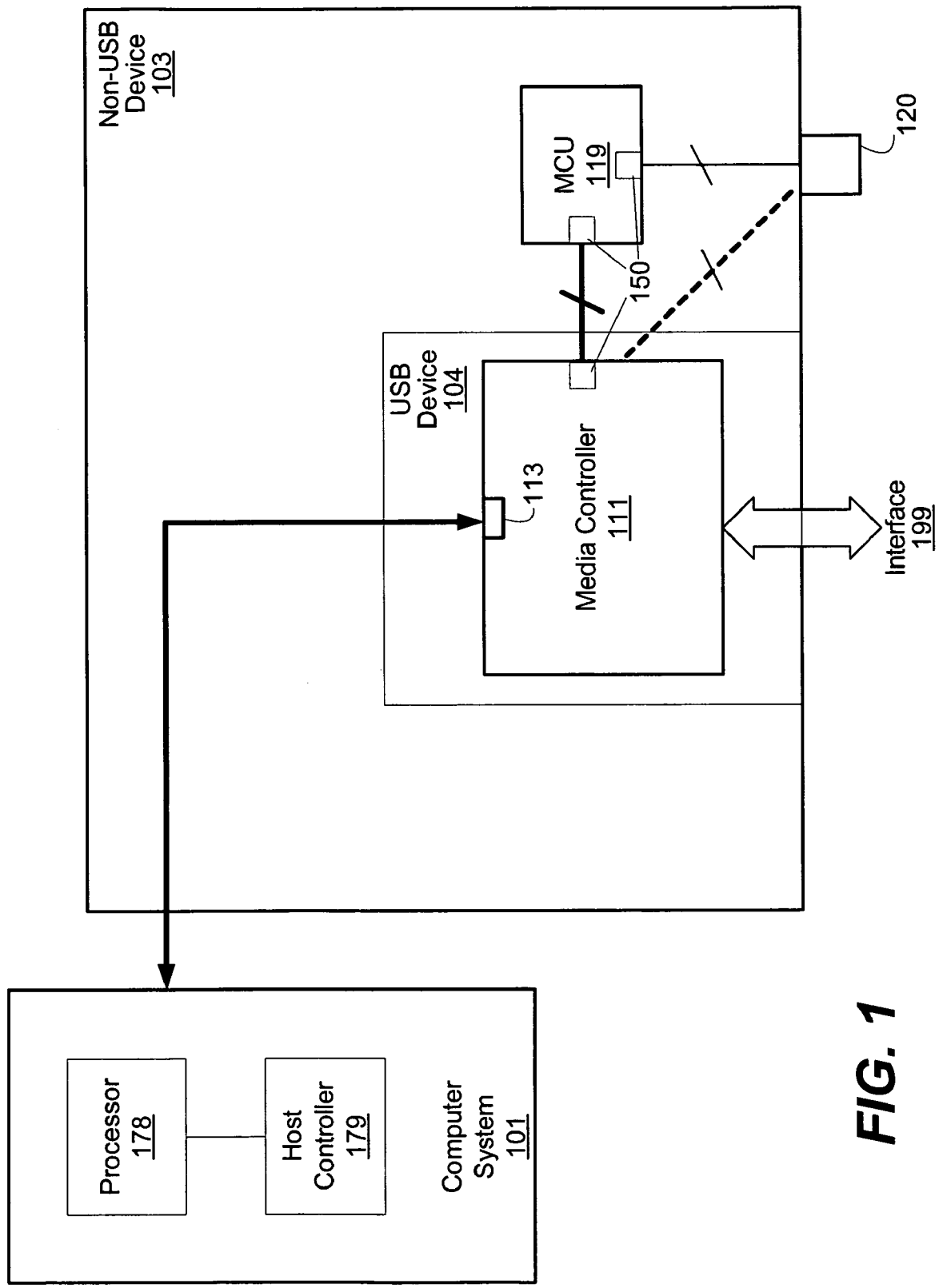
FIG. 1 illustrates a non-USB device coupled to a computer system through a Universal Serial Bus (USB) device, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

FIG. 1 illustrates an embodiment of a non-USB device 103 coupled to a computer system 101 through a USB device 104 (e.g., through a controller on the USB device 104). In some embodiments, the non-USB device 103 may be any of various devices (e.g., a printer, monitor, television set, set top box, etc.) coupled to the USB device 104.

In some embodiments, a host controller 179 coupled to processor 178 on the computer system 101 may communicate with the non-USB device 103 by embedding communications (e.g., commands and instructions) in SCSI (Small Computer Systems Interface) pass-through commands sent to the USB device 104 coupled to the non-USB device 103. The term "SCSI pass-through commands" is intended to have the full breadth of its ordinary meaning, and at least includes SCSI command sets as defined in SCSI standards (e.g., SCSI-1, SCSI-2, SCSI-3, Ultra-2, Ultra-3, Ultra-320, Ultra-640, iSCSI, and Serial SCSI). U.S. Pat. No. 6,901,456 (Leak) includes additional description of SCSI and is hereby incorporated by reference as though fully and completely set forth herein.

The SCSI pass through commands may be initiated on a driver executing on the computer system 101 and may be sent to a controller on a USB device coupled to the computer system 101. The driver may be a native driver (e.g., a USB mass storage class driver executing on the computer's operating system (OS)) or may be a user installed (e.g., from an external source) driver on the computer system 101. In some embodiments, the SCSI pass-through commands may be initiated by a USB mass storage class driver and may be sent to a mass storage device controller (such as USB media controller 111) on a USB mass storage device (e.g., USB device 104). USB mass storage devices may include, for example, card readers. Other types of devices/controllers are also contemplated. The mass storage device controller may pass the embedded commands directly to the non-USB device 103 or may communicate with the non-USB device 103 as directed by the commands. In addition, the non-USB device 103 may communicate with the host controller 179 through communications (e.g., embedded in SCSI pass-through commands) sent from the mass storage device controller to the host controller 179. USB mass storage devices and host controllers may use SCSI commands to communicate. These SCSI pass-through commands may therefore be used for communication between the host controller 179 and non-USB device 103 (via USB device 104) without adding additional hardware. In some embodiments, additional hardware may be used.

In some embodiments, commands embedded in the SCSI pass-through commands may be used to poll the non-USB device 103 for information. In some embodiments, the information may include status of components on the non-USB device 103 (e.g., one or more buttons 120), environmental data (e.g., device operating temperature), or various user inputs. Other information is also contemplated. For example, the information may include permission tokens sent from the non-USB device 103 (e.g., a television) to the computer system 101. In various embodiments, the information may be monitored by the USB media controller 111 through a microcontroller unit 119 (MCU) of the non-USB device 103. In some embodiments, the USB media controller 111 may be a USB mass storage device controller, although, other controllers are also contemplated. In some embodiments, the MCU 119 may be electrically coupled to the USB media controller 111. The MCU 119 may include a processor, memory, clock, and input/output (I/O) control unit. In some embodiments, the information may originate from the MCU's monitoring of, for example, buttons 120. In some embodiments, the USB media controller 111 may monitor component's statuses directly instead of or in addition to the MCU 119. In some embodiments, the USB media controller 111 may be coupled to the MCU 119 through one or more GPIO pins 150. The states of the monitored statuses may be transmitted over the GPIO pins 150. In some embodiments, the USB media controller 111 may have an upstream port 113. In some embodiments the USB media controller 111 may also provide an interface 199 to another device.

In some embodiments, software executing on the computer system 101 (e.g., an applet executing in the background by the computer system's operating system) may poll the non-USB device for the information (e.g., through SCSI pass-through commands sent to the USB device 104). In some embodiments, the status of the GPIO pins 150 may be polled through a command embedded in a SCSI pass-through command sent to the USB media controller 111 from the computer system 101. In some embodiments, when the USB media controller 111 receives the communication embedded in the SCSI pass-through command, it may return the current status of the GPIO pins 150 reprsentative of the monitored statuses of the non-USB device 103.

Figure 2:
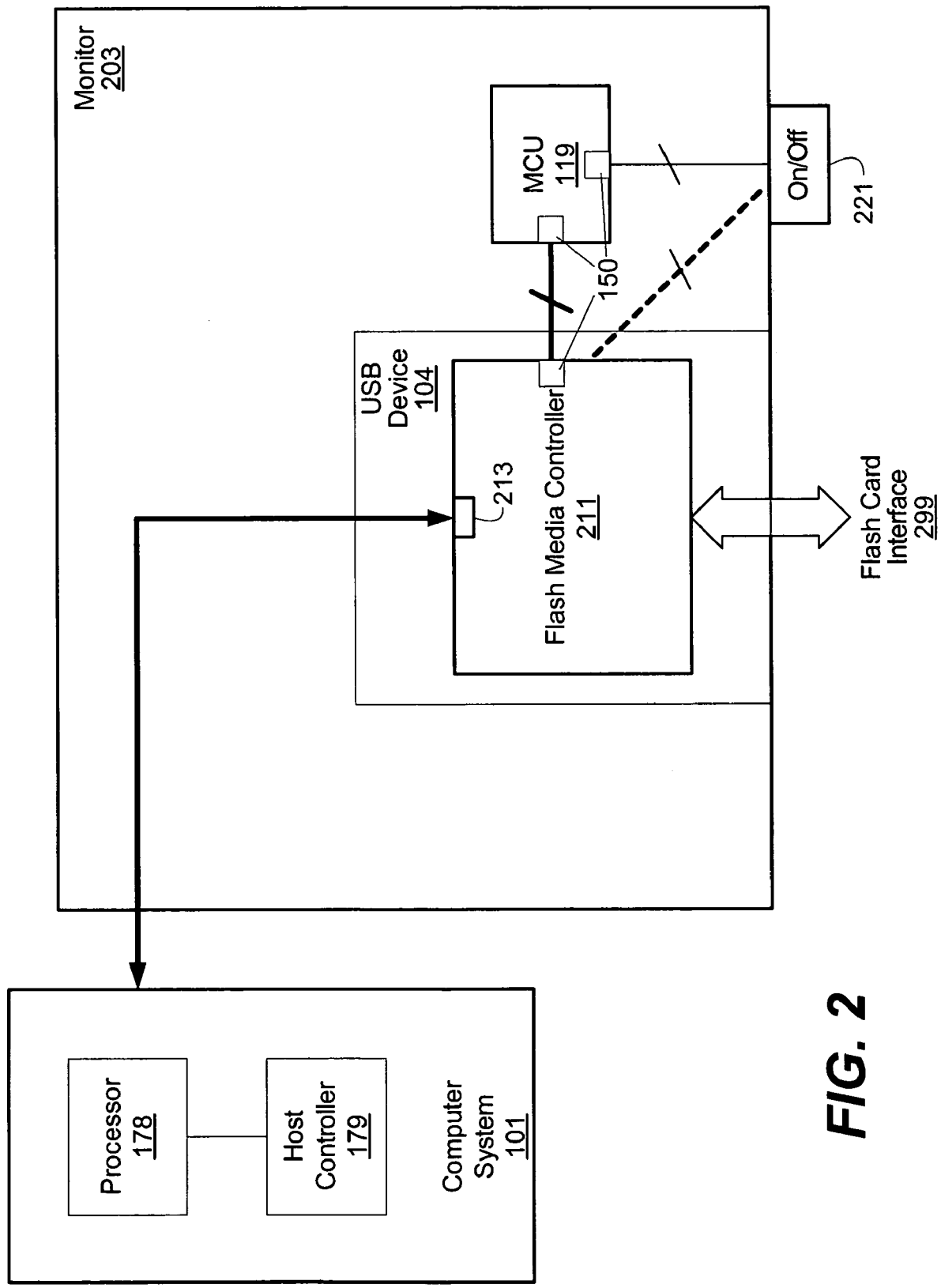
FIG. 2 illustrates a monitor coupled to the computer system, according to an embodiment.

FIG. 2 illustrates an embodiment of a monitor 203 coupled to the computer system 101. In some embodiments, the non-USB device may be a monitor 203 coupled to the computer system 101. The monitor 203 may include an embedded USB device 104 (e.g., a card reader). The flash USB media controller 211 may provide a flash media interface 299 to the card reader. The monitor 203 may include one or more buttons 221 (e.g., an on/off button, a brightness button, a contrast button, a menu button, etc.). In some embodiments, the statuses of the one or more buttons 221 may be monitored by a flash USB media controller 211 through an MCU 119 in the monitor 203. For example, if the on/off button 221 is pushed, a changed status (e.g., indicating on to off or off to on) may be transmitted via a GPIO pin 150 through the MCU 119 to the flash USB media controller 211. The status may be transmitted when the flash USB media controller 211 is polled by SCSI pass-through commands sent as a result of software executing on the computer system 101. In some embodiments, the status may be monitored directly by the flash USB media controller 211 instead of or in addition to the MCU 119.

Figure 3:
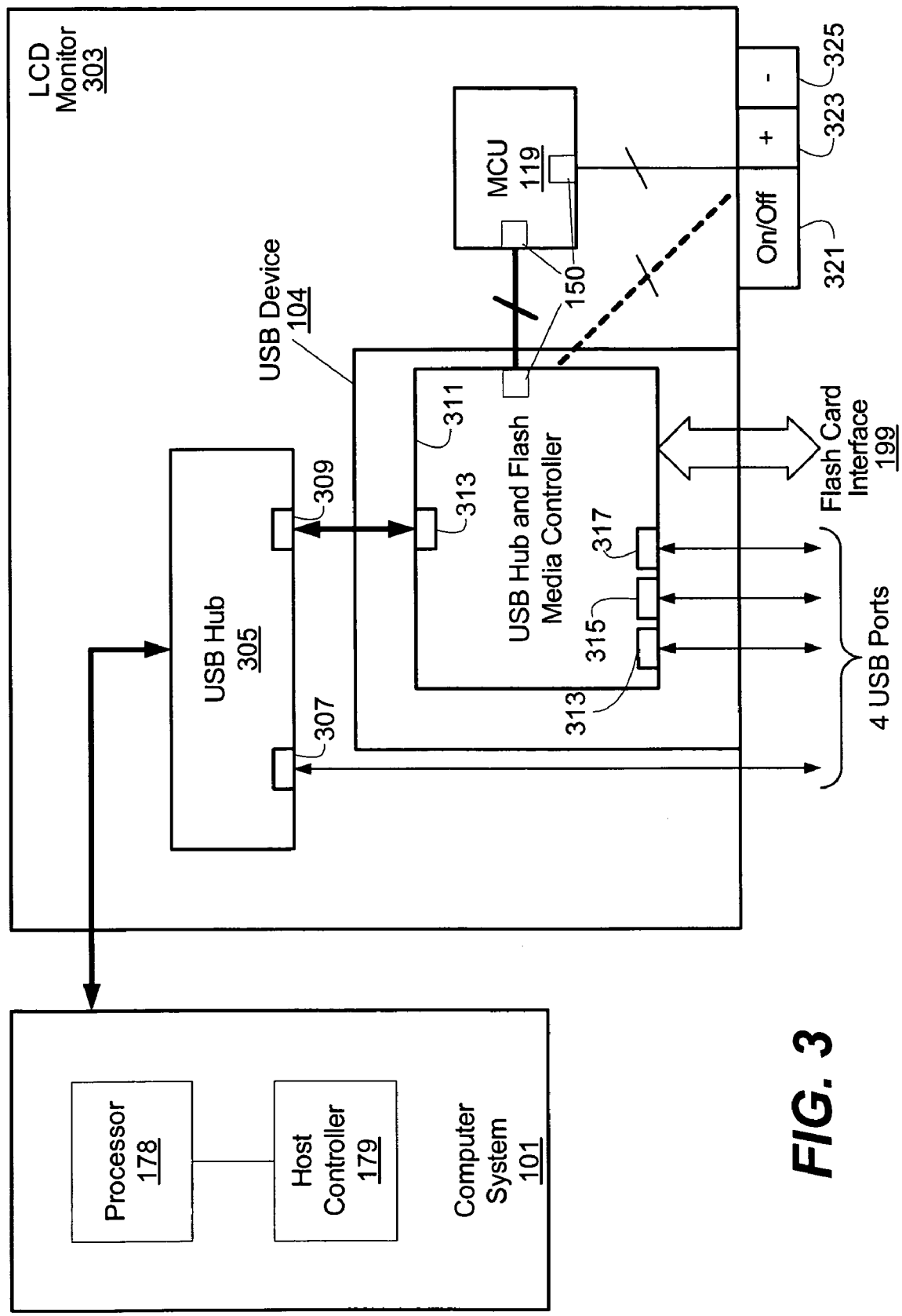
FIG. 3 illustrates a liquid crystal display (LCD) monitor coupled to the computer system, according to an embodiment.
Figure 5:
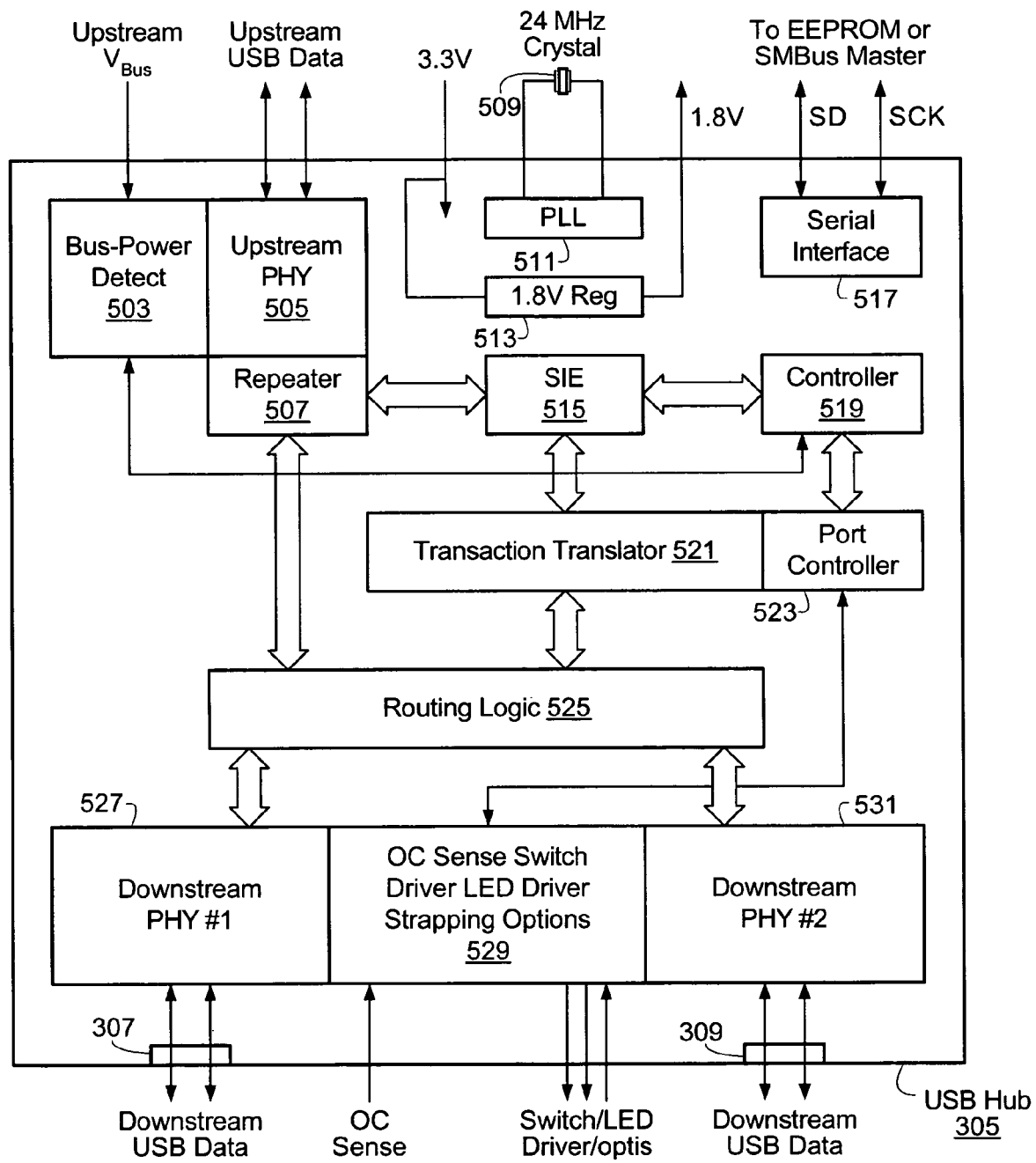
FIG. 5 illustrates additional detail of a USB hub, according to an embodiment.
Figure 6:
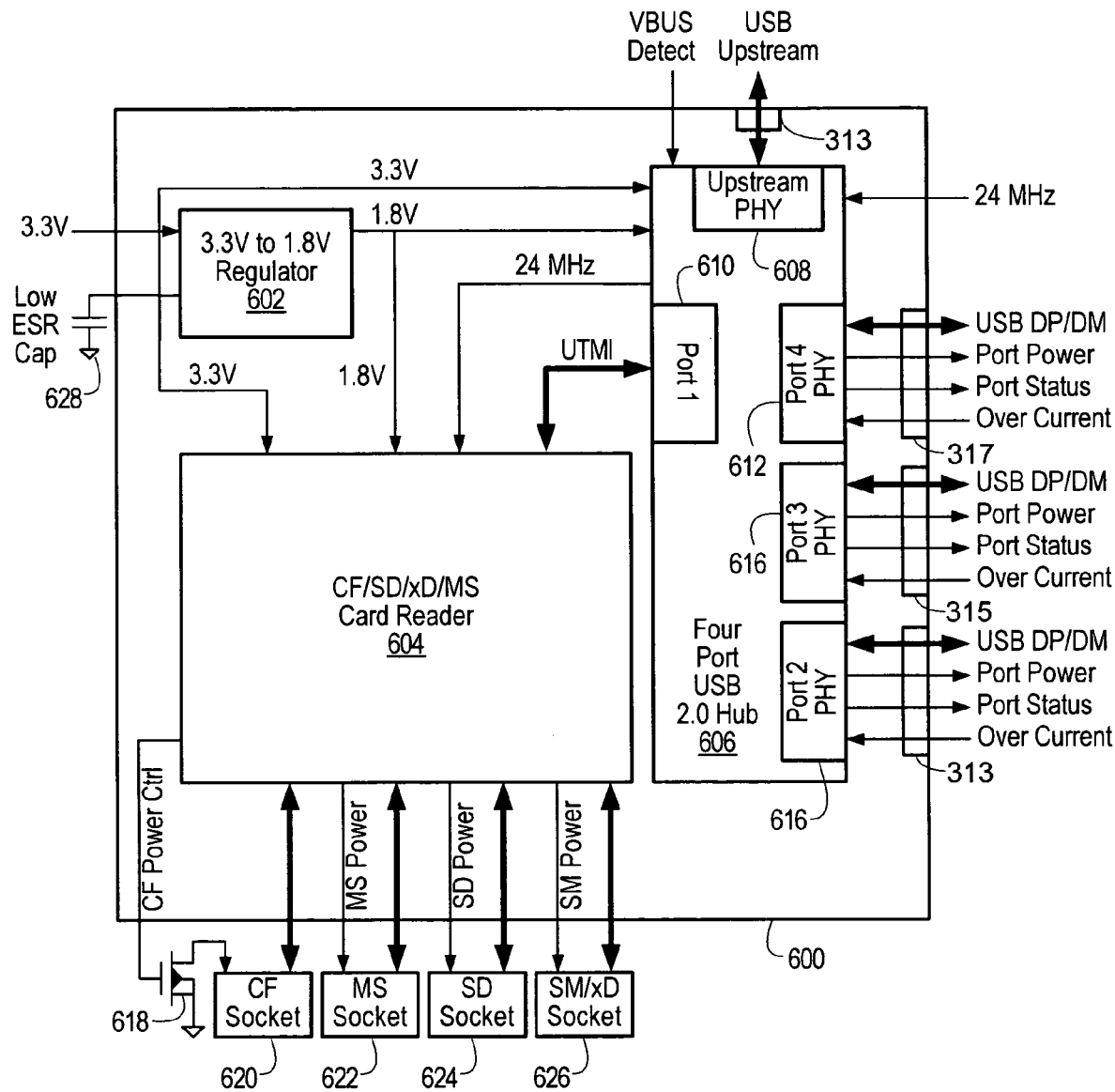
FIG. 6 illustrates additional detail of a flash USB media controller/USB hub combination, according to an embodiment.

FIG. 3 illustrates an embodiment of a liquid crystal display (LCD) monitor 303 coupled to a computer system 101. In some embodiments, the status may be transmitted through other components in addition to those previously described. For example, the flash USB media controller 311 may include a three downstream port USB hub (e.g., ports 313, 315, and 317) (for further detail, see the embodiment illustrated in FIG. 6). The flash USB media controller may be coupled to the computer system 101 through a second USB hub 305 (providing a total of 4 additional USB ports) (for further detail, see the embodiment illustrated in FIG. 5). Other numbers of USB hubs and ports are also contemplated. In some embodiments, additional buttons (e.g., buttons 321, 323, and 325) may be included. Additional GPIOs may be used to monitor the additional statuses. In some embodiments, the GPIO pins may include Universal Asynchronous Receiver-Transmitter (UART) pins. UART pins may also be used for debugging purposes.

Figure 4:
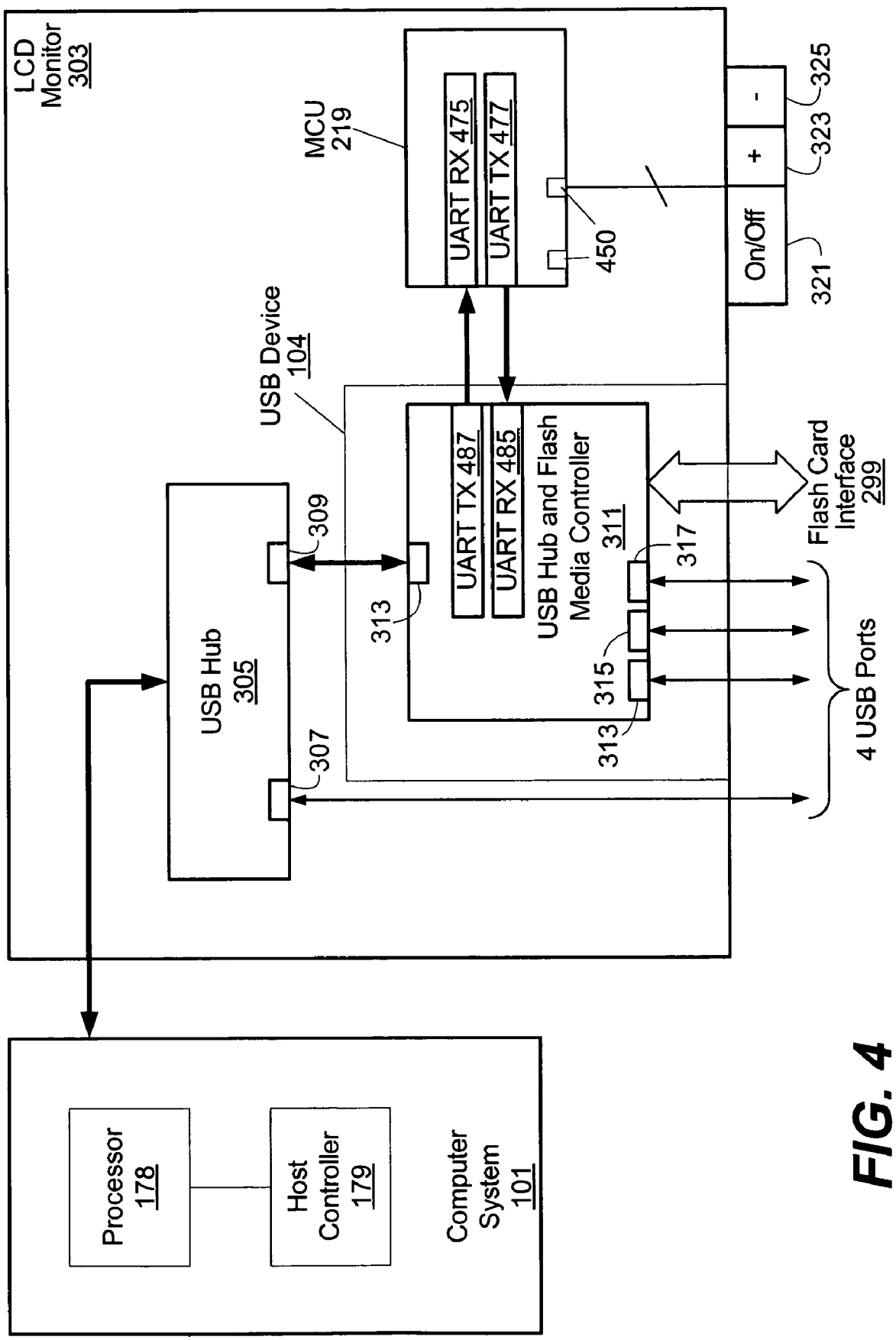
FIG. 4 illustrates a system with a flash USB media controller and an MCU, each with a set of UART pins, according to an embodiment.

In some embodiments, as seen in FIG. 4, the MCU 219 may communicate with the flash USB media controller 311 through a two-way byte oriented communication link (e.g., the status may be communicated to the flash USB media controller as an 8 bit data value). In some embodiments, the data value may be sent from an UART TX (transmit) pin 477 on the MCU 219 to a UART RX (receive) pin 485 on the flash USB media controller 311. Conversely, data from the computer system may be sent to a UART RX pin 475 on the MCU 219 from the UART TX pin 487 on the flash USB media controller 311. In some embodiments, a GPIO pin 450 on the MCU may be used as a reset pin for the USB device 104 (if needed).

In some embodiments, software executing on the computer system 101 (which may, for example, include an OS), may poll the flash USB media controller 311 (e.g., through SCSI pass-through commands) for the status of the buttons. In some embodiments, if a user presses an on/off button, the software may implement an OS shutdown applet that may present the user with a menu to select among options (e.g., by moving a mouse cursor on the screen). The computer system 101 may then implement the selection (e.g., may turn off the computer and the monitor if "Off" is selected). Other menus are also contemplated. For example, if the user pressed a brightness button 323, 325, an on screen pop-up menu may be displayed to allow the user to, for example, move a pop-up slider using a mouse cursor. The pop-up slider may display the old value and the user may move the slider to a new value. In some embodiments, the slider (or menu) may be displayed for a predetermined amount of time (e.g., 2 seconds). Other time periods are also contemplated. In some embodiments, the computer system (e.g., the host controller) may send an operational command with instructions or data to the non-USB device. For example, in response to the user moving the pop-up slider on screen to increase the brightness, a command (e.g., embedded in the SCSI pass-through commands sent to the media controller 311) may be sent to the monitor (e.g., to the monitor MCU 219) to increase the brightness.

Figure 7:
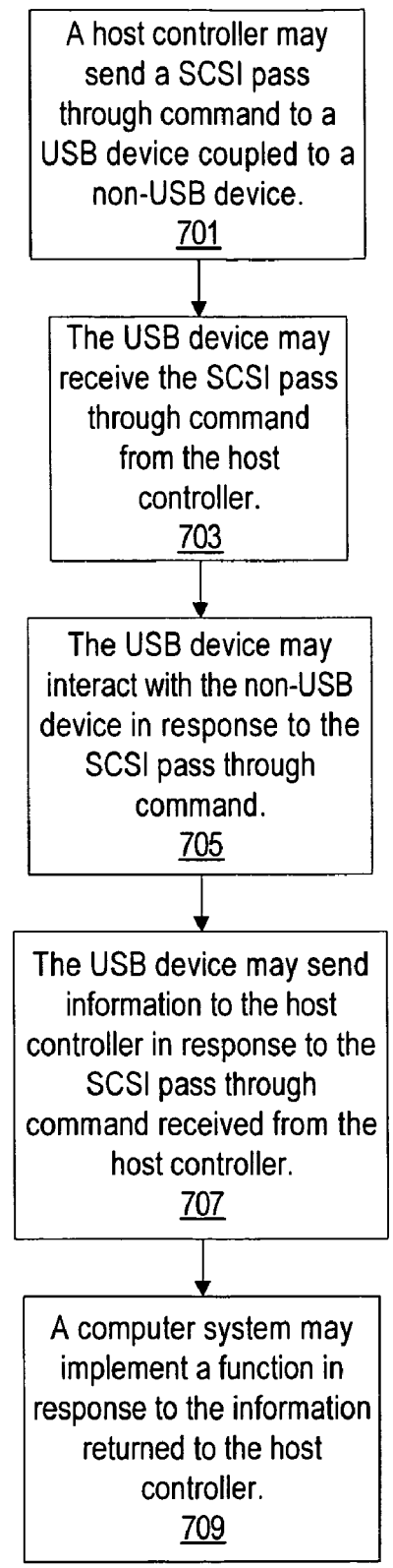
FIG. 7 illustrates a method of communicating between the non-USB device and the computer system, according to an embodiment.

FIG. 7 illustrates a method of communicating between a non-USB device and a computer system, according to an embodiment. It should be noted that in various embodiments of the methods described below, one or more of the elements described may be performed concurrently, in a different order than shown, or may be omitted entirely. Other additional elements may also be performed as desired.

At 701, a host controller may send a SCSI pass-through command to a USB device coupled to a non-USB device. In some embodiments, the non-USB device may have a controller.

At 703, the USB device may receive the SCSI pass-through command from the host controller.

At 705, the USB device may interact with the non-USB device in response to the SCSI pass-through command. For example, the command may instruct the USB device to poll the non-USB device. In some embodiments, the USB device may send an instruction or other data to the non-USB device. Other interactions are also contemplated.

At 707, the USB device may send information to the host controller in response to the SCSI pass-through command received from the host controller. For example, the USB device may send information on the status of one or more components of the non-USB device to the host controller.

At 709, a computer system may implement a function in response to the information returned to the host controller. For example, the computer system may implement an on-screen menu with options for a user to select. In some embodiments, the host controller may again send a SCSI pass-through command with instructions for the non-USB device based on the user selection.

Figure 8:
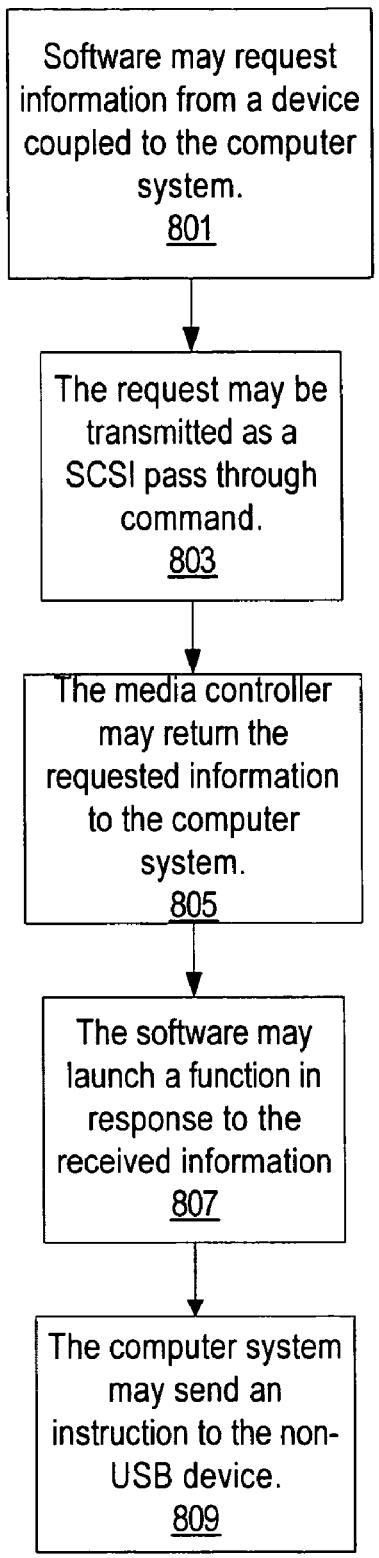
FIG. 8 illustrates a method of polling the non-USB device by the computer system, according to an embodiment.

FIG. 8 illustrates a method of polling a non-USB device by a computer system, according to an embodiment. It should be noted that in various embodiments of the methods described below, one or more of the elements described may be performed concurrently, in a different order than shown, or may be omitted entirely. Other additional elements may also be performed as desired.

At 801, software executing on a computer system (e.g., an applet) may request information from a non-USB device coupled to the computer system through a USB device. In some embodiments, the software may regularly request (e.g., poll) information from the non-USB device. For example, the non-USB device may be polled approximately every 100 to 150 milliseconds (ms) (e.g., to monitor button statuses). Other time periods are also contemplated. For example, the applet may send a command approximately every 250 ms. As another example, if requesting the operating temperature of the non-USB device, the non-USB device may be polled every 10 minutes.

At 803, the request may be transmitted as a command embedded in a SCSI pass-through command. In some embodiments, the SCSI pass-through command may be sent from a USB mass storage class driver over a USB bus coupling the computer system and the USB device. In some embodiments, the SCSI pass-through command may be sent to a USB media controller coupled to the non-USB device.

At 805, the USB media controller may return the requested information to the computer system. In some embodiments, the information may be collected by the USB media controller by monitoring the state of one or more GPIO pins. For example, a status change of one or more buttons may be applied to one or more GPIO pins between the buttons and the USB media controller. In some embodiments, an MCU between the USB media controller and the buttons may receive status information of the buttons via the GPIO pins. In some embodiments, other information may be monitored (e.g., temperature).

In some embodiments, the USB media controller may return the last value of a byte received on its GPIO pins (e.g., its UART pins) if it has not been read by the command previously, or may return no data if it has not received a new byte from the MCU or directly via its GPIO pins. The command from the computer may also transmit information to the MCU (e.g., a brightness level or an off command resulting from a menu selection by the user). In some embodiments, pin state may be reported for every logical unit number (LUN). Each command may specify to which LUN it is directed towards. In some embodiments, the applet and/or MCU may regulate data flow to prevent data overruns. In addition, in some embodiments, vendor specific commands may be sent between the computer system and the MCU.

Figure 9:
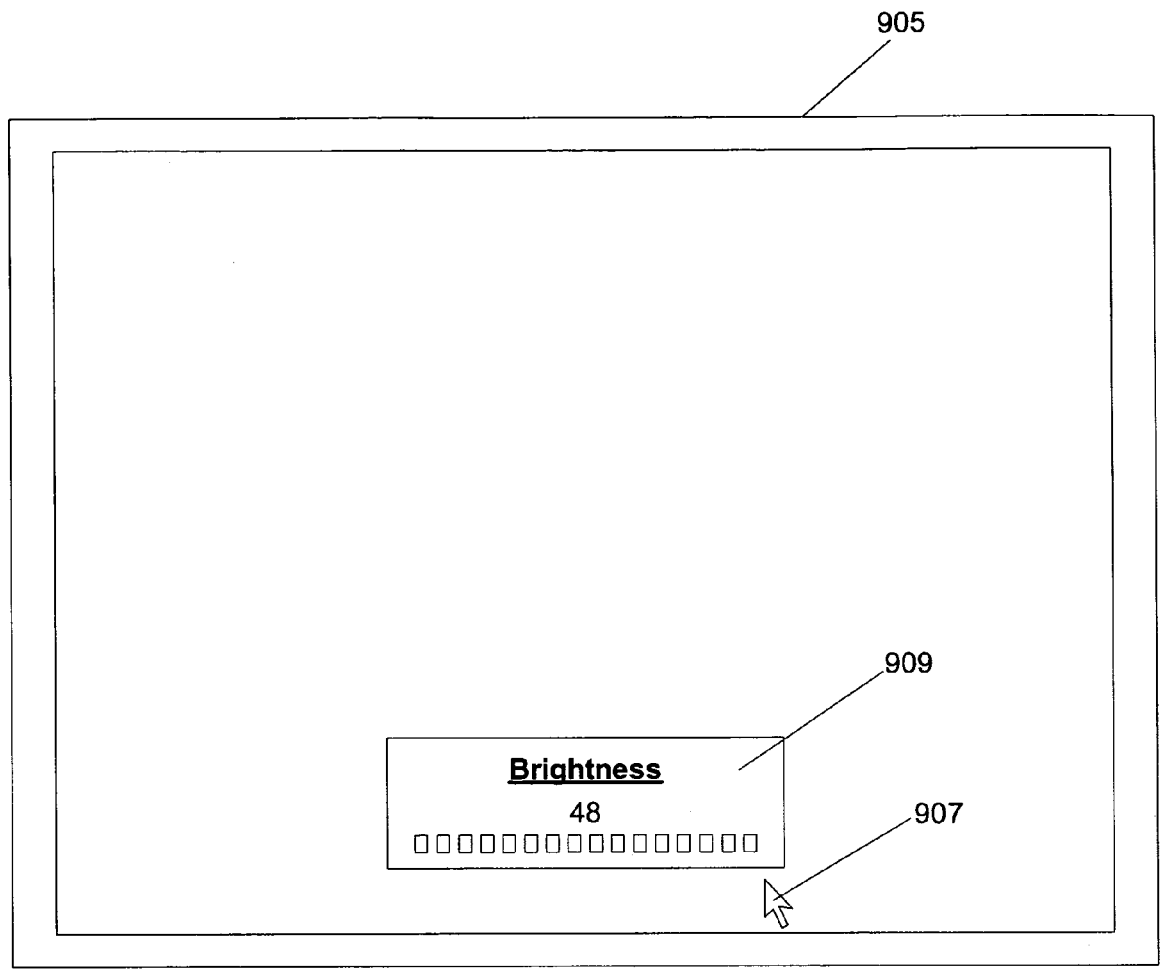
FIG. 9 illustrates an on screen menu, according to an embodiment.

At 807, the software executing on the computer system may launch a function in response to the received information. For example, as seen in FIG. 9, if the device is a monitor 905 and the information indicates a button (e.g., a brightness button) has been pressed, the software may implement an on screen menu 909 with a brightness selector for the user. In some embodiments, the user may interface with the displayed on screen menu using a mouse cursor 907. Other functions and interfaces are also contemplated.

At 809, the computer system may send an instruction to the non-USB device. In some embodiments, the instruction may be embedded in a SCSI command sent to the non-USB device. The commands may include, for example, instructions to adjust the brightness of the monitor (e.g., in response to a user selecting an increased brightness on an on-screen menu). A command may also include an instruction to turn off the monitor. Other commands are also contemplated (e.g., commands to adjust the contrast). In some embodiments, the instruction may include information embedded in the SCSI command sent to the non-USB device to affect the operation of the non-USB device (e.g., the information may include a requested brightness value). The non-USB device may receive the information (e.g., the monitor may receive the requested brightness value and may adjust the monitor brightness).

Embodiments of these methods may be implemented by program instructions stored in a memory medium or carrier medium. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, the computer system may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system, comprising:
   a processor;
   a host controller coupled to the processor;
   a Universal Serial Bus (USB) device coupled to the host controller, wherein the USB device comprises a first controller; and
   a non-USB device coupled to the USB device, wherein the non-USB device comprises a second controller;
   wherein the host controller is configured to communicate an embedded small computer system interface (SCSI) pass-through command to the first controller of the USB device;
   wherein the first controller of the USB device is operable to pass the embedded SCSI pass-through command through to the second controller of the non-USB device without extracting the SCSI pass-through command.

2. The system of claim 1, wherein a native driver, accessible to the host controller, initiates the embedded SCSI pass-through command.

3. The system of claim 2, wherein the native driver is a mass storage class driver, and wherein the USB device is a USB mass storage device.

4. The system of claim 1,
   wherein the USB device comprises a USB card reader; and
   wherein the non-USB device comprises a monitor.

5. The system of claim 1, wherein the host controller is further configured to send information through the embedded SCSI pass-through command to the second controller of the non-USB device to affect operation of the non-USB device.

6. The system of claim 1, wherein the first controller on the USB device is configured to send information, embedded in a SCSI pass-through command from the second controller of the non-USB device, to the host controller.

7. A method comprising:
   a host controller sending an embedded SCSI pass-through command to a USB device coupled to a non-USB device;
   the USB device receiving the embedded SCSI pass-through command;
   the USB device extracting the embedded SCSI command; and
   the USB device interacting with the non-USB device in response to the extracted SCSI pass-through command;
   wherein the USB device is operable to extract the embedded SCSI command and interact with the non-USB device in response to the extracted SCSI command without passing the extracted SCSI command to the non-USB device.

8. The method of claim 7, further comprising the USB device sending information to the host controller in response to the embedded SCSI pass-through command received from the host controller.

9. The method of claim 8, wherein the host controller sends the embedded SCSI pass-through command to poll the USB device for information relative to the non-USB device coupled to the USB device.

10. The method of claim 8, wherein the non-USB device is a monitor, and wherein the information comprises a status of at least one button on the monitor.

11. The method of claim 7, further comprising:
    the USB device sending information to the host controller in response to the received embedded SCSI command; and
    a computer system implementing a function in response to the information returned to the host controller.

12. A system, comprising:
    a computer system, comprising:

a processor;
a host controller coupled to the processor;
a USB device coupled to the computer system, comprising:
   a USB controller;
   one or more first general purpose input/output (GPIO) pins coupled to the USB controller;
   wherein the USB controller is communicatively coupled to the host controller;
a non-USB device, comprising:
   a microcontroller unit (MCU);
   one or more second GPIO pins coupled to the MCU;
   wherein the MCU is communicatively coupled to the USB controller through the first and second GPIO pins;
wherein the USB controller is configured to monitor a status of one or more components of the non-USB device through the first and second GPIO pins;
wherein the host controller is configured to send an embedded SCSI pass-through command, using a mass storage class driver, to the USB controller to poll the status of the one or more components; and
wherein the USB device is configured to periodically monitor at least one status relative to the non-USB device; and
wherein the USB device is configured to communicate the at least one status to the host controller in response to the embedded SCSI pass-through command sent to the USB device from the host controller.

13. The system of claim 12, wherein the non-USB device is a monitor, and wherein the status includes the status of at least one button on the monitor, wherein the at least one button comprises one or more of an on/off button and a brightness button.

14. The system of claim 12, wherein the processor is operable to execute software that regularly polls the status of the one or more components.

15. The system of claim 14, wherein the software is further operable to implement a function in response to the status of the one or more components.

16. The system of claim 15, wherein the function is an on screen pop-up menu.

17. The method of claim 7, further comprising
   the USB device monitoring at least one status relative to the non-USB device; and
   the USB device communicating the at least one status to the host controller in response to the embedded SCSI pass-through command sent to the USB device from the host controller.

18. The method of claim 17, wherein communicating the at least one status to the host controller in response to the embedded SCSI pass-through command comprises sending a status stored on the USB device, wherein the communicated at least one status is not polled in response to the received embedded SCSI pass-through command.

19. The method of claim 7,
   wherein the USB device comprises a USB card reader; and
   wherein the non-USB device comprises a monitor.

20. The system of claim 1; wherein the first controller is a USB media controller and wherein the second controller is a non-USB microcontroller.

* * * * *